United States Patent

[11] 3,554,49

[72] Inventor Georg Nusstein
 Munich, Germany
[21] Appl. No. 636,715
[22] Filed May 8, 1967
[45] Patented Jan. 12, 1971
[73] Assignee Firma Georg Seidl
 Munich, Germany
[32] Priority May 14, 1966
[33] Germany
[31] S103,818

[54] INJECTION MOLDING APPARATUS PROVIDED WITH INTERNAL PLASTICIZING CAPSULE
9 Claims, 3 Drawing Figs.
[52] U.S. Cl. ................................................... 259/4
[51] Int. Cl. ..................................................... B01f 15/02
[50] Field of Search........................................... 259/4, 18, 36, 37, 19, 60, 61, 2

[56] References Cited
UNITED STATES PATENTS
2,583,206 1/1952 Borck............................ 259/4
2,584,827 2/1952 Bailey............................ 259/4

FOREIGN PATENTS
742,209 12/1932 France ........................ 259
1,226,047 2/1960 France ........................ 259

Primary Examiner—Robert W. Jenkins
Attorney—Silverman & Cass

ABSTRACT: An injection molding apparatus of the type which a piston moves a mass of material along a cylind toward a nozzle and in which there is an internal plasticizir capsule within the cylinder which has a plurality of intern balls held in place therein so that the plastic material must forced through the capsule and pass through the interstic between the balls, thereby thoroughly mixing the material ar raising its temperature by friction to assist in plasticizing t same. The balls are held within the capsule in an arrangemer which includes a large ball at each end of the capsule, the being an opening at each end, and a ring of smaller balls hol ing each large ball in place, the capsule being removable fro the cylinder and capable of being disassembled to release t balls and permit ready cleaning.

PATENTED JAN 12 1971

3,554,496

INVENTOR
GEORG NUSSTEIN
By Silverman + Cass
ATTORNEYS

INJECTION MOLDING APPARATUS PROVIDED WITH INTERNAL PLASTICIZING CAPSULE

BACKGROUND OF THE INVENTION

This invention relates generally to injection molding apparatus and more particularly is concerned with apparatus in which there is an internal removable capsule in the injection cylinder through which the plastic material is forced during molding for homogenizing and heating such material.

The injection molding machine is well-known as such and generally comprises an injection cylinder within which a reciprocating piston is arranged to force the material which is to be injected into a mold through a nozzle and into such mold. The material is normally introduced into the cylinder in powder, piece or granular form and as the piston moves forward it is desirable to increase the temperature of the material and thoroughly mix the same so that a homogeneous plastic mass is available at the injection nozzle.

In prior structures, the mixing and heating of the mass being forced forward by the piston has, at least in part, been effected by means of baffle devices installed in the cylinders between the piston and the nozzle. One known device of this kind consisted of a torpedo or capsule which was in the form of a cylinder having a plurality of small axial holes formed therein, thus requiring the mass to be compressed ahead of the capsule and thereafter extruded through the axial holes. Several disadvantages attached to this form of structure.

Such capsules are expensive to manufacture because each must have the plurality of axial holes bored throughout its length. These holes additionally are difficult to clean when changing from one material to another, especially where the colors of the respective materials are different. Furthermore, this form of baffle device provides substantially less frictional heat than required satisfactorily to plasticize many plastic materials, thereby requiring additional heating means for the apparatus and thus increasing the manufacturing costs of the articles being manufactured by the apparatus.

SUMMARY OF THE INVENTION

The invention contemplates a novel solution to the problems which are mentioned above, and hence the principal object of the invention is to provide an injection molding apparatus which is more economical and more efficient than prior apparatus of this type.

The solution to the problems is achieved by providing a capsule in the injection cylinder which is formed of two separable parts, each having a constricted opening at its end and being hollow so as to provide a through passageway for the materials being forced through the capsule, but there being a plurality of balls of steel or the like packed into the capsule, thereby providing a plurality of tortuous passageways for the expression of material through the capsule, this serving not only to thoroughly homogenize the material but also providing substantial friction to raise the temperature of the mass. This results in a highly efficient plasticizing of the material so that it may freely be injected through the nozzle into the mold.

An important object of the invention is to provide a structure as generally described above.

Still another object of the invention is to provide an injection molding apparatus which includes a hollow capsule installed internally of the injecting cylinder in the path of material being forced through the cylinder by the piston, there being a plurality of small generally rounded bodies packed into the capsule, these bodies being in contact with one another at points on their surfaces which provide a large number of interstices, and the bodies being unbound one to another so that said bodies may be removed from the capsule and separated from one another to facilitate cleaning and the like.

Another object of the invention is to provide a capsule for use in an injection molding machine which is formed of separable parts having a plurality of unbound bodies secured on the interior of the capsule and providing interstices for the passage of plastic material in a tortuous manner to gene large amounts of frictional heat and to plasticize homogenize the material.

Still a further object of the invention is to provide a cap of the character described in which the bodies comprise of different sizes mounted in a novel manner.

Many other advantages and objects of the invention occur to those skilled in this art from the ensuing discussic which preferred embodiments of the invention are descr in detail and illustrated in the accompanying drawing. M variations in structural features and arrangement of ] thereof may occur to the skilled artisan without depa from the scope or sacrificing any of the advantages of th vention.

DESCRIPTION OF THE PREFERRED EMBODIMEN

Figure 1:
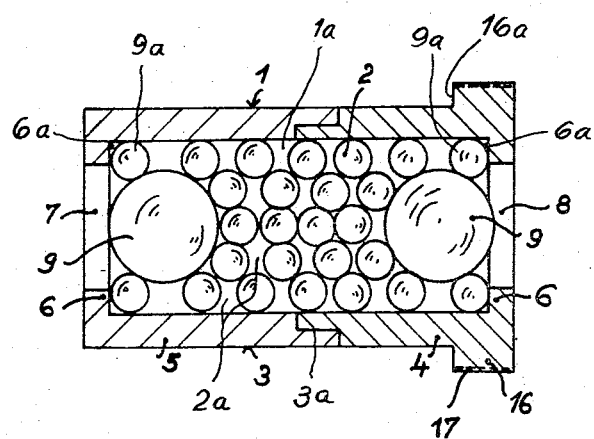
FIG. 1 is a median sectional view through a capsule fo in an injection molding machine, constructed in accord with the invention.

In FIG. 1 there is illustrated a median sectional through a capsule constructed in accordance with the ir tion. The capsule is designated generally by the refer character 1 and is formed as a hollow cylindrical memt having an internal chamber 1a which contains a plurali balls 2 of steel or other suitable material. The body 3 o capsule 1 is formed of two parts 4 and 5 which are sec together by means not shown, and are readily separab provide access to the interior hollow chamber 1a. For e ple, a mating separable joint 3a enables axial separation c two parts 4 and 5 approximately at the center of the t Each end face of the respective parts 4 and 5 is provided a relatively large coaxial opening to enable the passage c plastic material through the capsule during use thereof. 1 openings are defined by annular flanges 6 which provide an internal shoulder 6a for a purpose presently t described.

The left hand opening 7 is the inlet port and the right opening 8 is the outlet port for the passage of material thr the capsule from left to right.

Through the use of a large number of small balls 2, a tively large number of interstices 2a is formed providing ; rality of tortuous passageways for movement of ma through the capsule. The ports 7 and 8 are each blocked relatively large ball 9, each being supported by a rii smaller balls 9a seated against the respective annular s ders 6a. In this manner, the balls 9 form closures to retai internal balls 2 in place so that these latter balls may be d ly packed and provide a considerable surface for gener high frictional temperatures, without the danger of fallin; Likewise, the spherical surfaces presented to the openi and 8 promote easy flow into and out of the capsule 1.

The Size of the balls 2, 9a and 9 and their relative diam may be adjusted experimentally for the physical propert the different materials being processed by the use of the sule 1.

Figure 2:
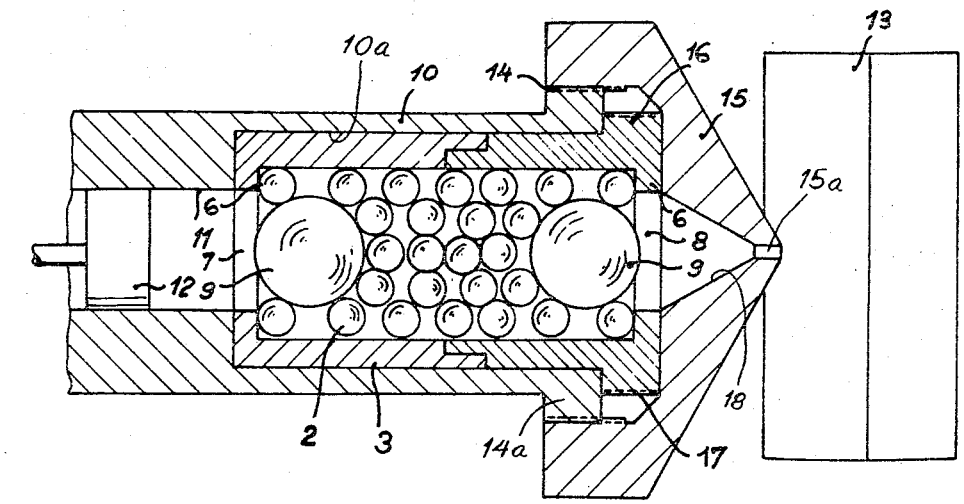
FIG. 2 is a median sectional view through a portion of a jection molding apparatus having the capsule of FIG. 1 i nally installed therein, the apparatus being constructed ii cordance with the invention.

In FIG. 2 the capsule 1 is shown associated with an inje molding machine, being installed internally thereof. cylinder 10 of the molding machine provides an enlarg ternal cylindrical chamber 10a within which the capsul disposed. There is a cylindrical compression chambe opening into the chamber 10a, coaxially aligned wit opening 7 and preferably having the same diameter as t ternal diameter of the flange 6 so that materials pressed chamber 11 by movement of the piston 12 will readily enter the chamber 1a without interference by the left end of cylindrical member 3. The materials to be plasticized are introduced into the compression chamber 11 to the right of the piston by any conventional means (not shown).

The right hand end of the capsule is preferably enlarged at 16 to form a shoulder 16a which engages against the flange 1 formed on the end of the cylinder 10, thereby properly seating the capsule within the chamber 10a. An end cap 15 having a central nozzle 15a is screw-threaded onto the flange 1 by means of cooperating threads indicated at 14. A conical passageway 18 formed coaxially of the end cap 15 connects the outlet port 8 with the nozzle 15a to lead the plasticized material from the capsule to the mold 13. The latter is shown in diagrammatic representation.

It will be appreciated that during operation, movement of the piston 12 from left to right forces the materials to be plasticized into the capsule 1, and into the assembly of balls 2 contained in the hollow chamber 1a. The multiplicity of interstices, extending not only axially, but radially in all directions, thoroughly mixes the materials and produces considerable heat due to friction. This temperature increase assists materially in plasticizing materials, and in the case of certain other materials, such as rubber, shortens the time required for vulcanization in a later step. This step is especially favorable in the manufacture of pieces having thick walls.

The capsule is readily disassembled from the injection molding machine by unscrewing the end cap 15 to expose the flanged end 16 protruding from the cylinder 10. Any suitable pulling device enables the entire capsule 1 bodily to be withdrawn from its seated condition in the chamber 10a. For example, the flange 16 may be threaded at 17 on its periphery, and the pulling tool (not shown) under such circumstances would have a nut or other part which is screwed onto the flange to enable the withdrawing force to be applied. After removal, the parts 4 and 5 are separated and this releases all of the balls which are easily manipulated out of the two parts and cleaned, or replaced, if desired.

The construction of the capsule 1 is quite simple while being very effective and highly efficient. The only parts which need be made specially are the parts 4 and 5, balls being commercially available in practically any desired sizes.

Figure 3:
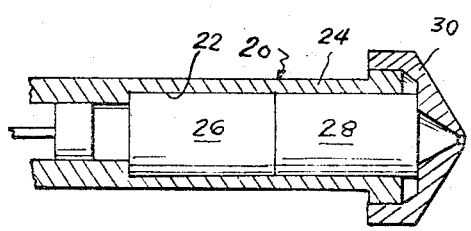
FIG. 3 is a median, sectional, generally schematic through a portion of a molding machine showing a mod form of the invention.

The capsule may be used in many kinds of injection molding machines and in the performance of many different kinds of molding. The bodies need not be balls, although these are perhaps the most economical, but might have any different geometric shape, providing they are capable of being packed closely into the hollow body 3 and will provide the tortuous passageways. The novelty of the structure is enhanced by virtue of the fact there is no bond between the bodies, all of them being independent and hence easily assembled into the capsule. Nonetheless, when the parts 4 and 5 of the capsule body are connected together, the bodies combine to form a labyrinth or multipassage baffle through which the plastic material is forced, and which results in a thorough mixing and high temperature being produced in a relatively short axial distance. In certain structures it might be desirable to use several of these capsules in a cylinder, coaxially arranged forming a chamber similar to that shown in FIG. 2 at 10a, but of course longer. In this type of structure, the end flange 16 would be eliminated, and other means used to seat the interior capsule or capsules, and to withdraw the same when desired. Thus in FIG. 3, the molding machine 20 has a chamber 22 in the cylinder 24 with two capsules 26 and 28 therein, these having the construction of the capsule 1, but without the end flange 16. End cap 30 holds the capsules in place. The remainder of the structure is obvious.

It is believed that the invention has been sufficiently described to enable the skilled artisan to understand and practice the same. The invention has been distinctly pointed out in the appended claims intended to be broadly and liberally construed.

I claim:
1. A capsule for installation internally of an injection molding apparatus within the cylinder of such apparatus, comprising:
   a. a hollow cylindrical member providing an internal chamber and having end ports to enable plastic materials to be expressed through the interior of the body;
   b. a plurality of bodies disposed within said cylindrical member;
      i. said bodies being in contacting engagement with one another,
      ii. having configurations to provide a plurality of interstices through which the said plastic material may pass in a tortuous path,
      iii. said bodies being of at least two different sizes, there being a first smaller size interior of the capsule and the second larger size disposed at the said end ports; and
   c. means being provided for securing said bodies within the cylindrical member.

2. The capsule of claim 1 in which the bodies comprise balls.

3. The capsule as claimed in claim 2 in which said member is formed of two parts secured together to retain said capsule and balls in assembly, but separable in an axial direction to enable removal of said balls.

4. The capsule of claim 1 in which said end ports are coaxial openings.

5. The capsule of claim 1 in which the bodies are balls, and there is a single ball of said second larger size disposed in each of said end ports with certain others of said smaller balls arranged in cooperative position relative to said larger size balls to constitute said certain others and said single balls said securing means.

6. The capsule of claim 5 in which said securing means include flanges surrounding said end ports to seat said certain other smaller balls in said cooperative position.

7. A capsule as claimed in claim 1 in which said bodies comprise balls, said ports comprise circular coaxial end openings, with one opening at each end of said member, said balls comprise a plurality of small interior balls, and a pair of large balls, said securing means including internal annular seating means about each said opening, there being a ring of smaller balls seated against each seating means of diameter substantially smaller than the diameter of said large balls, and one each of said pair being respectively secured internally of said rings of smaller balls and against said ring.

8. The capsule of claim 7 in which said member is formed of a plurality of parts capable of disassembly in an axial direction.

9. The capsule as claimed in claim 1 in which said member is formed of two parts secured together to retain the capsule and bodies in assembly, but separable in an axial direction to enable removal of said bodies from said member independently of one another.